(12) United States Patent
Morris

(10) Patent No.: US 8,833,802 B2
(45) Date of Patent: Sep. 16, 2014

(54) MISALIGNED PIPE CONNECTOR

(75) Inventor: Bruce E. Morris, Magnolia, TX (US)

(73) Assignee: Oil States Industries, Inc., Arlington, TX (US)

( * ) Notice: Subject to any disclaimer, the term of this patent is extended or adjusted under 35 U.S.C. 154(b) by 37 days.

(21) Appl. No.: 13/291,816

(22) Filed: Nov. 8, 2011

(65) Prior Publication Data
US 2013/0113207 A1 May 9, 2013

(51) Int. Cl.
*F16L 27/04* (2006.01)

(52) U.S. Cl.
USPC .......................................... 285/261; 285/263

(58) Field of Classification Search
USPC .............. 285/263, 264, 261, 51, 121.7, 138.1
See application file for complete search history.

(56) References Cited

U.S. PATENT DOCUMENTS

| | | | | |
|---|---|---|---|---|
| 664,291 | A * | 12/1900 | Reniff | 285/107 |
| 797,547 | A | 8/1905 | Bachelder | |
| 1,425,635 | A * | 8/1922 | Dod | 285/121.7 |
| 1,753,989 | A | 4/1930 | Wilhelm | |
| 1,767,658 | A | 6/1930 | Fantz | |
| 2,369,849 | A * | 2/1945 | Phillips | 174/21 JC |
| 2,587,934 | A | 3/1952 | Volpin | |
| 2,931,672 | A * | 4/1960 | Merritt et al. | 285/138.1 |
| 3,139,932 | A | 7/1964 | Johnson | |
| 3,186,014 | A | 6/1965 | Herbert | |
| 3,278,203 | A * | 10/1966 | Snyder | 285/138.1 |
| 3,475,039 | A * | 10/1969 | Ortloff | 285/45 |
| 3,479,061 | A * | 11/1969 | Smookler et al. | 285/94 |
| 3,545,489 | A | 12/1970 | Brown et al. | |
| 3,664,376 | A | 5/1972 | Watkins | |
| 3,674,123 | A | 7/1972 | Lewis et al. | |
| 3,860,271 | A * | 1/1975 | Rodgers | 285/97 |
| 3,955,793 | A | 5/1976 | Burkhardt et al. | |
| 4,045,054 | A * | 8/1977 | Arnold | 285/18 |
| 4,224,986 | A | 9/1980 | Rothberg | |
| 4,230,299 | A | 10/1980 | Pierce, Jr. | |
| 4,291,724 | A | 9/1981 | Miller | |
| 4,372,337 | A | 2/1983 | Holzenberger | |
| 4,411,459 | A | 10/1983 | Ver Nooy | |
| 4,650,151 | A | 3/1987 | Mcintyre | |
| 4,800,927 | A * | 1/1989 | Torichigai et al. | 138/109 |
| 4,821,772 | A | 4/1989 | Anderson, Jr. et al. | |
| 4,865,078 | A | 9/1989 | Ensign | |

(Continued)

OTHER PUBLICATIONS

Tiratsoo, J.N.H., Pipeline Design for Pigging, Pipeline Pigging Technology, second edition, 1999, pp. 47-53, Butterworth-Heinemann, Woburn, MA.

*Primary Examiner* — Aaron Dunwoody
(74) *Attorney, Agent, or Firm* — Richard Auchterlonie; Novak Druce Connolly Bove + Quigg LLP

(57) ABSTRACT

A misalignment ball joint fitting includes first and second body portion coupled together and having spherical inner surfaces. A ball secured inside the body portions has a passage therein. The passage has a funnel shaped portion in a first end portion of the ball. The ball is allowed to at least partially rotate when secured inside the first and second body portions. A guide sleeve is coupled to the first body portion. The guide sleeve is coaxial with the ball passage. A recess is in an inner surface of the ball near a center of the ball. An end of the guide sleeve extends into at least a portion of the recess when the ball is in a neutral position with walls of the passage in the ball parallel to walls of the guide sleeve.

20 Claims, 2 Drawing Sheets

(56) References Cited

U.S. PATENT DOCUMENTS

| | | | |
|---|---|---|---|
| 4,964,612 A | 10/1990 | Maggioni et al. | |
| 4,971,307 A | 11/1990 | Killerud et al. | |
| 5,076,308 A | 12/1991 | Cohen | |
| 5,076,319 A | 12/1991 | Salley | |
| 5,082,391 A | 1/1992 | Florida | |
| 5,215,112 A | 6/1993 | Davison | |
| 5,307,838 A | 5/1994 | D'agostino et al. | |
| 5,368,342 A * | 11/1994 | Latham et al. | 285/261 |
| 5,490,660 A | 2/1996 | Kamezawa | |
| 5,842,816 A | 12/1998 | Cunningham | |
| 5,857,715 A | 1/1999 | Gray et al. | |
| 5,893,392 A | 4/1999 | Spies et al. | |
| 6,142,708 A | 11/2000 | Tarlton et al. | |
| 6,164,188 A | 12/2000 | Miser | |
| 6,260,819 B1 | 7/2001 | Ovsepyan | |
| 6,276,662 B1 | 8/2001 | Bugatti | |
| 6,283,152 B1 | 9/2001 | Corte, Jr. et al. | |
| 6,290,207 B1 | 9/2001 | Genga et al. | |
| 6,311,727 B1 | 11/2001 | Campau | |
| 6,340,148 B1 | 1/2002 | Sung | |
| 6,578,881 B2 | 6/2003 | Lynn et al. | |
| 6,851,478 B2 | 2/2005 | Cornelssen et al. | |
| 6,886,805 B2 | 5/2005 | Mccarty | |
| 6,935,615 B2 | 8/2005 | Mccarty | |
| 7,891,377 B2 | 2/2011 | Morris | |
| 8,038,177 B2 | 10/2011 | Gutierrez-Lemini et al. | |
| 8,151,394 B2 | 4/2012 | Morris et al. | |
| 8,151,825 B2 | 4/2012 | Morris | |
| 8,360,155 B2 | 1/2013 | Avery et al. | |
| 8,360,391 B2 | 1/2013 | Morris | |
| 2003/0020034 A1 | 1/2003 | Newport et al. | |
| 2004/0149951 A1 | 8/2004 | Gethmann | |
| 2009/0212558 A1 | 8/2009 | Gutierrez-Lemini et al. | |
| 2010/0065140 A1 | 3/2010 | Joynson et al. | |

* cited by examiner

MISALIGNED PIPE CONNECTOR

BACKGROUND

1. Field of the Invention

The present invention relates to subsea pipelines and connectors and/or fittings used in the pipelines. More particularly, the invention relates to a ball joint used for connecting misaligned pipes in subsea pipelines.

2. Description of Related Art

Misalignment ball joints have been used in pipelines (e.g., subsea pipelines) for decades. Misalignment ball joint use increased dramatically in the 1960's due to a tremendous increase in the number of subsea pipeline tie-ins being used. Misalignment ball joints provide a great degree of tie-in flexibility and allow tie-in connections to be made even with limited diver visibility and/or with difficult or limited manipulation available due to rigid pipes.

Typical misalignment ball joints have an internal profile of the ball portion of the misalignment ball joint assembly that contains a conical funnel. The conical funnel accommodates misalignment of the ball joint in any plane (typically up to as great as 15° of misalignment). In some cases, at full misalignment (for example, about 15° of misalignment), the projection of the bore of the ball produces an apparent obstruction from the exposed spherical surface of the cup.

U.S. Pat. No. 4,045,054 to Arnold ("Arnold"), which is incorporated by reference as if fully set forth herein, used a guide sleeve to overcome problems associated with the apparent obstruction. The guide sleeve concept disclosed by Arnold, however, saw little to no use in the industry. The lack of use of any form of the guide sleeve in misalignment ball joints may have been likely due to the relative low sophistication of pigs during the era of Arnold. In addition, pigging studies from the United States and the United Kingdom indicated that no restriction in articulation was required for pig passage from the cup sphere toward the funnel and that by limiting the articulation of the ball joint to 5°, the cup sphere exposure did not detrimentally impinge on the pig.

In recent years, however, "intelligent" pigs have started gaining use in offshore pipeline inspection and all new pipelines are being reviewed for intelligent pig suitability. These intelligent pigs include, for example, fingers, shoes, wheels, and/or other similar components mounted on relatively fragile, spring-loaded suspension arms to keep sensors in contact with the pipe bore. Thus, these intelligent pigs may require a relatively smooth surface for passage through the misalignment ball joint. Any obstruction (such as the apparent obstruction produced by projection of the bore of the ball) may inhibit passage of an intelligent pig through the misalignment ball joint. The guide sleeve disclosed by Arnold removes the apparent obstruction.

Arnold discloses a sleeve that is truncated to provide clearance between the end of the sleeve and the ball conical funnel as the ball joint components are articulated relative to each other when the pipe bores of the two attached pipes are misaligned during installation and makeup. As the assembly articulates, however, an opening between the sleeve end and ball funnel is exposed in the plane of the articulation. The opening is sufficiently large to allow some sensors to engage the opening and the end of the sleeve, which may result in damage to the pig and subsequent inspection data loss.

Thus, there is a need for a misalignment ball joint that provides a relatively smooth surface to inhibit damage to the sensors of an intelligent pig. The relatively smooth surface may have little to no gaps along the surface for passage of an intelligent pig through the misalignment ball joint.

SUMMARY

In certain embodiments, a misalignment ball joint fitting includes a first body portion having a spherical inner surface. A second body portion having a spherical inner surface is coupled to the first body portion. A ball having a passage therein is secured inside the first and second body portions when the body portions are coupled. The passage has a funnel shaped portion in a first end portion of the ball. The ball is allowed to at least partially rotate when secured inside the first and second body portions. A guide sleeve is coupled to the first body portion. The guide sleeve is coaxial with the ball passage. A recess is located in an inner surface of the ball near a center of the ball. An end of the guide sleeve extends into at least a portion of the recess when the ball is in a neutral position with walls of the passage in the ball parallel to walls of the guide sleeve. The end of the guide sleeve that extends into the recess may have a beveled profile.

In some embodiments, the recess is located at an end of the funnel shaped portion of the passage near the center of the ball. The recess may be a spherical or arcuate recess. In some embodiments, the funnel shaped portion of the passage slopes from a smaller diameter at the recess to a larger diameter at the first end of the ball. In certain embodiments, the recess is sized to provide a relatively smooth transition between an inner surface of the guide sleeve and the inner surface of the ball for an object passing through the fitting during use at any angle of rotation of the ball. The end of the sleeve may remain in close association with the recess at any angle of rotation of the ball. There may be little to no gap between the end of the guide sleeve and the inner surface of the ball when the ball is rotated a maximum amount of rotation.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
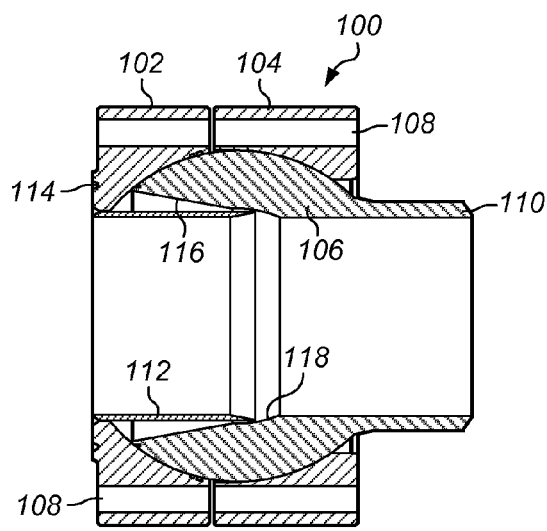
FIG. 1 depicts a cross-sectional representation of an embodiment of a misalignment ball joint fitting.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "fitting" means a fitting or connector that may be coupled into a pipeline (e.g., a subsea pipeline). The term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner. The term "open flow" means that flow is open to both fluid and objects through a passage.

Figure 2:
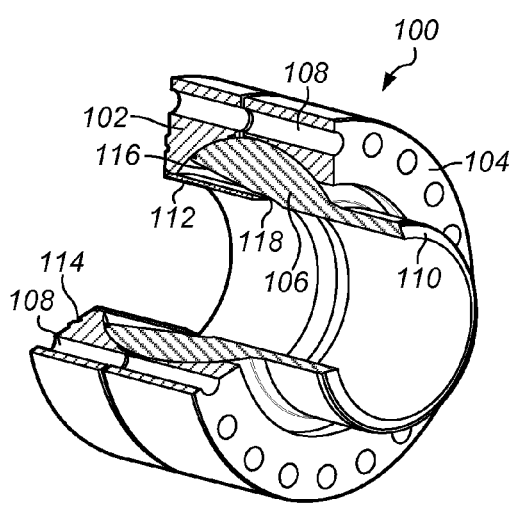
FIG. 2 depicts an isometric cutaway view of the embodiment of the fitting depicted in FIG. 1 shown from a grip side of the fitting.
Figure 3:
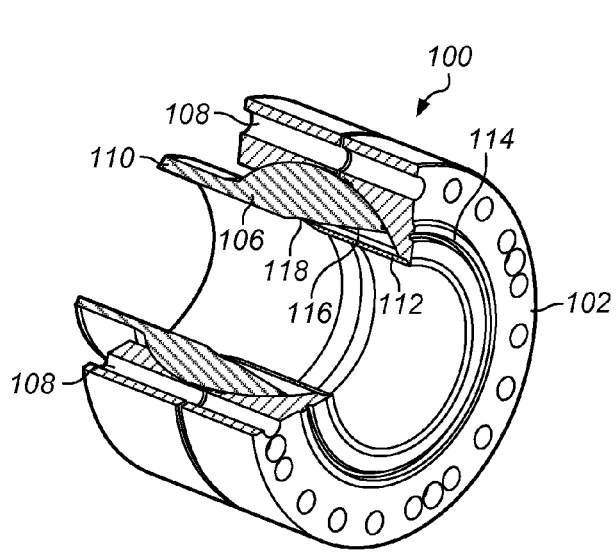
FIG. 3 depicts an isometric cutaway view of the embodiment of the fitting depicted in FIG. 1 shown from a cup side of the fitting.

FIG. 1 depicts a cross-sectional representation of an embodiment of misalignment ball joint fitting 100. FIG. 2 depicts an isometric cutaway view of the embodiment of fitting 100 depicted in FIG. 1 shown from a grip side of the fitting. FIG. 3 depicts an isometric cutaway view of the embodiment of fitting 100 depicted in FIG. 1 shown from a cup side of the fitting. Fitting 100 is generally used for making connections between pipes, additional fittings, or combinations thereof that may be misaligned due to the nature of the connections being made. For example, fitting 100 may be used to connect the ends of two pipes that are axially misaligned because the pipes are floating in a subsea environment.

In certain embodiments, fitting 100 includes cup 102, grip 104, and ball 106. Cup 102 and grip 104 may be portions that are coupled together around ball 106 to form a body for fitting 100 and secure the ball inside the fitting. In some embodiments, cup 102 and grip 104 are flange type portions that are coupled together. In certain embodiments, cup 102 and grip 104 have spherical interior profiles (inner surfaces) shaped to accommodate the exterior profile (surface) of ball 106. The spherical profiles allow ball 106 to rotate inside fitting 100. Cup 102, grip 104, and ball 106 are typically made of metals such as, but not limited to, stainless steels or other non-corrosive metals.

Cup 102 and grip 104 may include openings 108. Openings 108 may be used for fasteners (e.g., bolts) or other devices to secure cup 102 to grip 104. In some embodiments, a gasket or other sealing device is used between cup 102 and grip 104 to provide a seal between the cup and the grip and around ball 106.

In certain embodiments, ball 106 has cylindrical end 110 that extends outside fitting 100, as shown in FIGS. 1-3. End 110 may be used to couple to, for example, another fitting or a section of pipe (e.g., a section of subsea pipeline). In some embodiments, end 110 is welded to a section of pipeline. End 110 may, however, be coupled to a section of pipe using any method known in the art (e.g., the end have threads for attaching to a section of pipe).

In certain embodiments, fitting 100 includes sleeve 112. Sleeve 112 may be, for example, a conduit sleeve or guide sleeve. Sleeve 112 may be attached to cup 102. Sleeve 112 may be attached, for example, by welding the sleeve to cup 102 or by providing the sleeve with threads that engage threads on the cup. Sleeve 112 is typically made of metals such as, but not limited to, stainless steels or other non-corrosive metals. In certain embodiments, sleeve 112 and ball 106 are coaxial. For example, sleeve 112 and ball 106 may have a common central axis through the center of fitting 100.

In certain embodiments, an end of sleeve 112 is flush with the face of cup 102, as shown in FIGS. 1-3. The flush ends of sleeve 112 and cup 102 allows the cup end of fitting 100 to be coupled to another fitting or a section of pipe (e.g., a section of subsea pipeline). For example, the cup end of fitting 100 may be coupled to a section of pipe using a gasket or other sealing device placed in groove 114 on cup 102. In certain embodiments, fasteners provided through openings 108 in cup 102 and grip 104 are used to attach fitting 100 to a section of pipe or another fitting. For example, fitting 100 may be attached to a fitting with an opening on a subsea pipeline using fasteners provided through openings 108 and a gasket in groove 114 between the fitting and the fitting on the subsea pipeline.

In certain embodiments, ball 106 includes opening 107 through the ball. Opening 107 may be a longitudinal or lengthwise opening (passage) through ball 106. Opening 107 may be coaxial with the opening of sleeve 112. In certain embodiments, a portion of opening 107 inside ball 106 includes funnel portion 116. Funnel portion 116 typically slopes from a smaller diameter near the middle of fitting 100 to a larger diameter near the cup end of the fitting. Thus, funnel portion 116 enlarges opening 107 from the middle of fitting 100 to the cup end of the fitting.

Figure 4:
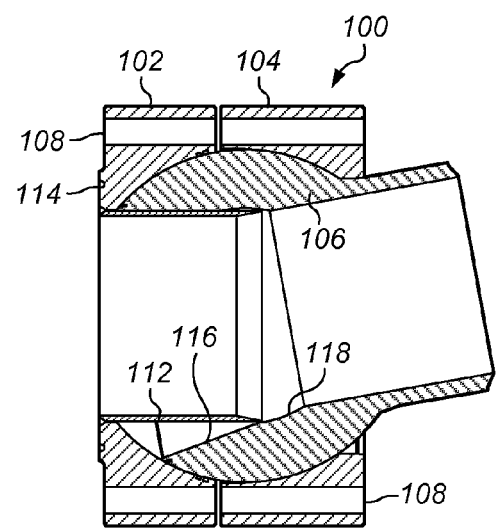
FIG. 4 depicts a cross-sectional representation of an embodiment of a misalignment ball joint fitting with the ball rotated.
Figure 5:
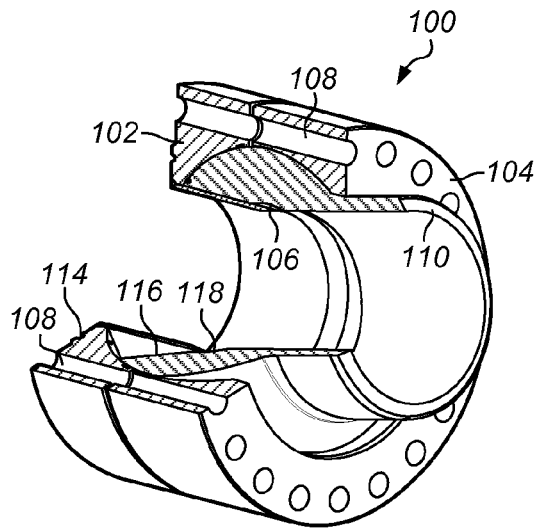
FIG. 5 depicts an isometric cutaway view of an embodiment of fitting, shown from the grip side of the fitting, with the ball rotated.
Figure 6:
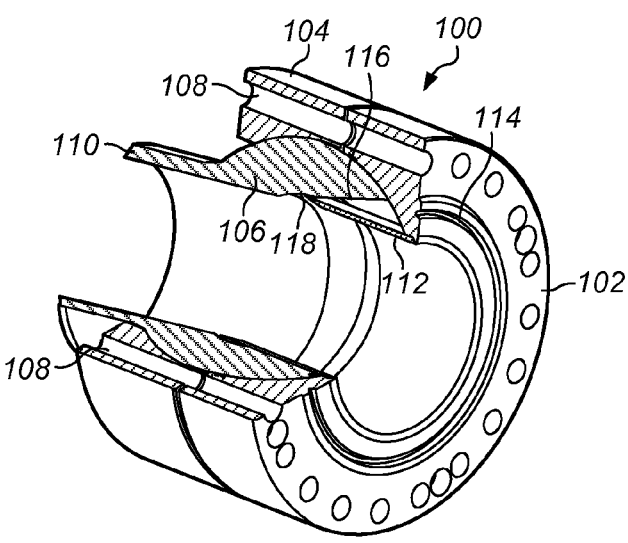
FIG. 6 depicts an isometric cutaway view of an embodiment of fitting, shown from the cup side of the fitting, with the ball rotated.

Funnel portion 116 provides a range of movement for ball 106 around sleeve 112. For example, funnel portion 116 provides space for ball 106 to rotate up or down, as shown in FIG. 1, until the wall of the funnel portion contacts the wall of sleeve 112. FIGS. 4-6 depict ball 106 rotated upwards such that the wall of funnel portion 116 is contacting the wall of sleeve 112. FIG. 4 depicts a cross-sectional representation of an embodiment of misalignment ball joint fitting 100 with ball 106 rotated. FIG. 5 depicts an isometric cutaway view of the embodiment of fitting 100, shown from the grip side of the fitting, with ball 106 rotated. FIG. 6 depicts an isometric cutaway view of the embodiment of fitting 100, shown from the cup side of the fitting, with ball 106 rotated.

The slope of funnel portion 116 may determine the maximum amount of rotation (articulation) of ball 106 inside fitting 100. For example, the maximum amount of rotation of ball 106 may be increased by increasing the slope of funnel portion 116, from the smaller end to the larger end of the funnel. Increasing the slope allows ball 106 to rotate further before the wall of funnel portion 116 contacts the wall of sleeve 112. In certain embodiments, ball 106 is allowed to rotate up to about 15° off normal (e.g., 15° in either direction from the normal or neutral position (zero articulation) of the ball being aligned parallel with sleeve 112 for a total of 30° of rotation). In some embodiments, ball 106 is allowed to rotate up to angles greater than about 15° off normal. The maximum amount of rotation allowed for ball 106 may be varied based on factors such as, but not limited to, angles suitable for intelligent pig passage, the diameter of the pipeline, and/or the dimensions of fitting 100.

In certain embodiments, ball 106 includes recess 118, as shown in FIGS. 1-6. Recess 118 may be, for example, a spherical or arcuate recess. The profile (e.g., radius) of recess 118 may be sized to accommodate the end of sleeve 112. The end of sleeve 112 may extend into at least a portion of recess 118 when ball 106 has zero articulation (e.g., when the walls of the sleeve are parallel to the walls of opening 107 of the ball). Recess 118 may be sized to provide a relatively smooth transition between the inner surface of sleeve 112 and the inner surface of ball 106 for objects passing through fitting 100 at any articulation (rotation) angle of the ball. The end of sleeve 112 remains in close association with the inner surface of ball 106 at any rotation of the ball up to full rotation (articulation) of the ball. Thus, a pig (e.g., an intelligent pig) passing through fitting 100 does not encounter any significant discontinuities that may cause damage to sensors or other equipment on the outer surfaces of the pig no matter what the rotational position (articulation) of ball 106. For example, at full articulation (rotation), as shown in FIGS. 4-6, there is little to no gap between the inner surface of sleeve 112 and the inner surface of ball 106 unlike in previous misalignment ball joints.

Figure 7:
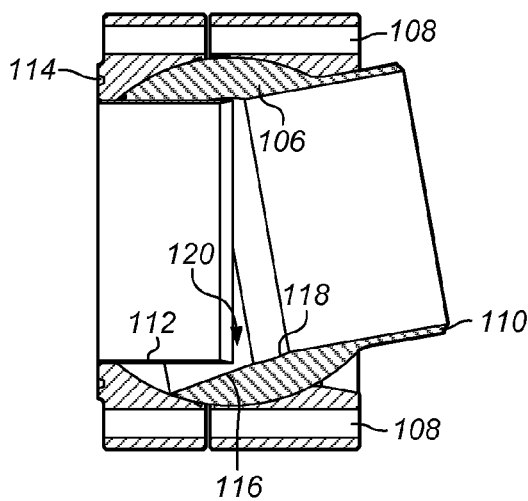
FIG. 7 depicts a cross-sectional representation of an embodiment of a misalignment ball joint fitting with a ball rotated and a gap between the end of a sleeve and the inner surface of the ball.

In some embodiments, there is a small gap between the end of sleeve 112 and the inner surface of ball 106 at full articulation (e.g., the end of the sleeve disassociated from the inner surface of the ball). The small gap may be due to the geometry of fitting 100. FIG. 7 depicts a cross-sectional representation of an embodiment of misalignment ball joint fitting 200 with ball 106 rotated and gap 120 between the end of sleeve 112 and the inner surface of the ball. In certain embodiments, fitting 200, depicted in FIG. 7, has larger dimensions than fitting 100, depicted in FIGS. 1-6. For example, fitting 200 may be a 30" pipe fitting while fitting 100 is a 12" pipe fitting. The difference in geometry caused by the difference in pipe fitting sizes may cause gap 120 to occur at full articulation of ball 106. In certain embodiments, however, gap 120 has acceptable tolerances for allowing smooth passage (guidance) of a pig through fitting 200 (e.g., the gap is not large enough to be noticed by sensors or other equipment on the outer surfaces of the pig and the pig is not affected by the gap as the pig passes through the fitting).

In certain embodiments, the end of sleeve 112 that extends into recess 118 has a beveled (sloped or thinning) profile, as shown in FIGS. 1-7. The beveled profile of the end of sleeve 112 provides a smoother profile for the passage of a pig through fitting 100 and/or fitting 200. For example, as shown in FIG. 4, the beveled profile of the end of sleeve 112 provides a smooth transition between the inner surface of the sleeve and the inner surface of ball 106 for a pig passing through fitting 100.

It is to be understood that while fitting 100 depicted in FIGS. 1-6 and fitting 200 depicted in FIG. 7 are typically used in subsea environments, the fittings may be used in other environments. For example, fitting 100 and/or fitting 200 may be used in shallow water operations (such as for pipeline transitions) and/or in land-based operations. In addition, fitting 100 and/or fitting 200 may include additional features that enable the fitting to be used in deep water applications (such as attachments for ROV handling). In addition, while fitting 100 and fitting 200 have generally been described for use with intelligent pigs, the fittings may also be used with other types of pigs such as, but not limited to, scrapper pigs and/or gauging pigs.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a bolt" includes a combination of two or more bolts and reference to "a fluid" includes mixtures of fluids.

In this patent, certain U.S. patents, U.S. patent applications, and other materials (for example, articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A misalignment ball joint fitting, comprising:
   a first body portion comprising a spherical inner surface;
   a second body portion comprising a spherical inner surface, the second body portion being coupled to the first body portion;
   a ball comprising a passage therein, wherein the passage has a funnel shaped portion in a first end portion of the ball, wherein at least a portion of the ball is secured inside the first and second body portions when the body portions are coupled, and wherein the ball is allowed to at least partially rotate when secured inside the first and second body portions;
   a guide sleeve attached to the first body portion, wherein the guide sleeve is not attached to the ball, wherein the guide sleeve is coaxial with the ball passage when the ball is in a neutral position with walls of the passage in the ball parallel to walls of the guide sleeve, and wherein a portion of the guide sleeve positioned inside the ball passage is substantially cylindrical; and
   a recess in an inner surface of the ball near a center of the ball, wherein an end of the guide sleeve extends into at least a portion of the recess when the ball is in the neutral position with the walls of the passage in the ball parallel to the walls of the guide sleeve.

2. The fitting of claim 1, wherein the recess is located at an end of the funnel shaped portion of the passage near the center of the ball.

3. The fitting of claim 1, wherein the recess comprises a spherical recess.

4. The fitting of claim 1, wherein the recess comprises an arcuate recess.

5. The fitting of claim 1, wherein the funnel shaped portion of the passage provides a range of movement for rotation of the ball.

6. The fitting of claim 1, wherein the funnel shaped portion of the passage slopes from a smaller diameter at the recess to a larger diameter at the first end of the ball.

7. The fitting of claim 1, wherein the recess is sized to provide a relatively smooth transition between an inner surface of the guide sleeve and the inner surface of the ball for an object passing through the fitting during use at any angle of rotation of the ball.

8. The fitting of claim 1, wherein the end of the sleeve remains in close association with the recess at any angle of rotation of the ball.

9. The fitting of claim 1, wherein there is little to no gap between the end of the guide sleeve and the inner surface of the ball when the ball is rotated a maximum amount of rotation.

10. The fitting of claim 1, wherein there is a small gap between the end of the guide sleeve and the inner surface of the ball when the ball is rotated a maximum amount of rotation, and the gap is sized to have acceptable tolerances for a pig to pass through the fitting without damaging sensors or other components on an outer surface of the pig.

11. The fitting of claim 1, wherein the end of the guide sleeve that extends into the recess comprises a beveled profile.

12. The fitting of claim 1, wherein an end of the guide sleeve opposite the end of the guide sleeve that extends into the recess is flush with an outer wall of the first body portion.

13. The fitting of claim 1, wherein the guide sleeve is attached to the first body portion at an end of the guide sleeve opposite the end of the guide sleeve that extends into the recess.

14. The fitting of claim 1, wherein the ball has zero articulation when the ball is in the neutral position.

15. The fitting of claim 1, wherein the ball is allowed to rotate up to about 15° from the neutral position.

16. The fitting of claim 1, wherein a slope of the funnel shape at the first end of the passage determines a maximum amount of rotation of the ball.

17. The fitting of claim 1, further comprising a seal between the first body portion and the second body portion.

18. The fitting of claim 1, wherein a wall of the funnel shape of the passage contacts an outer wall of the guide sleeve when the ball rotates to a maximum amount of rotation.

19. The fitting of claim 1, wherein the fitting is configured to be used to couple the ends of two axially misaligned subsurface pipes with each pipe being coupled to one body portion.

20. The fitting of claim 1, wherein the fitting is configured to be used in a subsurface environment.

* * * * *